C. L. STRAUB.
THREE-WAY VALVE.
APPLICATION FILED JULY 25, 1908.

967,460.

Patented Aug. 16, 1910.

2 SHEETS—SHEET 1.

Witnesses
C. H. Walker
L. E. Fischer

Inventor
C. Lee Straub
By E. B. Clark
Attorney

C. L. STRAUB.
THREE-WAY VALVE.
APPLICATION FILED JULY 25, 1908.

967,460.

Patented Aug. 16, 1910.

2 SHEETS—SHEET 2.

Witnesses
C. N. Walker.
L. E. Fischer

Inventor
C. Lee Straub
E. B. Clark

By

Attorney

UNITED STATES PATENT OFFICE.

CONSTANTINE LEE STRAUB, OF PERTH AMBOY, NEW JERSEY, ASSIGNOR TO MARINE PRODUCER GAS POWER COMPANY, A CORPORATION OF NEW YORK.

THREE-WAY VALVE.

967,460.  Specification of Letters Patent. Patented Aug. 16, 1910.

Application filed July 25, 1908. Serial No. 445,401.

*To all whom it may concern:*

Be it known that I, C. LEE STRAUB, a citizen of the United States, residing at Perth Amboy, in the county of Middlesex and State of New Jersey, have invented certain new and useful Improvements in Three-Way Valves, of which the following is a specification.

This invention relates to three-way plug valves, and is designed more particularly for use in a producer-gas generating apparatus, in pipe connections between the economizer (a tubular air heater) and the producer and between the latter and a purge pipe for blowing off waste gas from the producer.

The object of my invention is to provide a valve, of the above stated character, of light and simple construction, in which the casting surface, or tough skin made by the casting operation, on the plug is retained in the finished article, except at narrow or thin circumferential bearing ribs and other bearing ribs at the ports, whereby pitting and erosion of the metal by sulfurous acid and other erosive gases is prevented.

Another object is to provide on the plug bearing ribs with finished edges which will serve to scrape and clean the finished bearing surfaces of the casing in which the plug is rotated.

Another object is to make a tight fitting tapering plug adapted to yield or slide longitudinally, in its tapering casing, by impact of a blow or sudden pressure in case it sticks or binds under action of high heat of passing gas to which it is subjected, so that it may be rotated to cause its ports to register with different ports of the casing.

The improved features of construction and combinations of parts constituting the invention will be defined in the claims.

Figure 1:
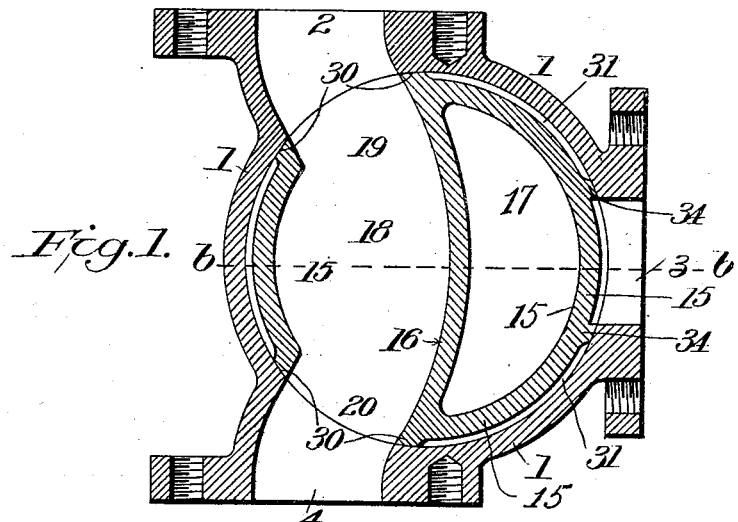
Figure 2:
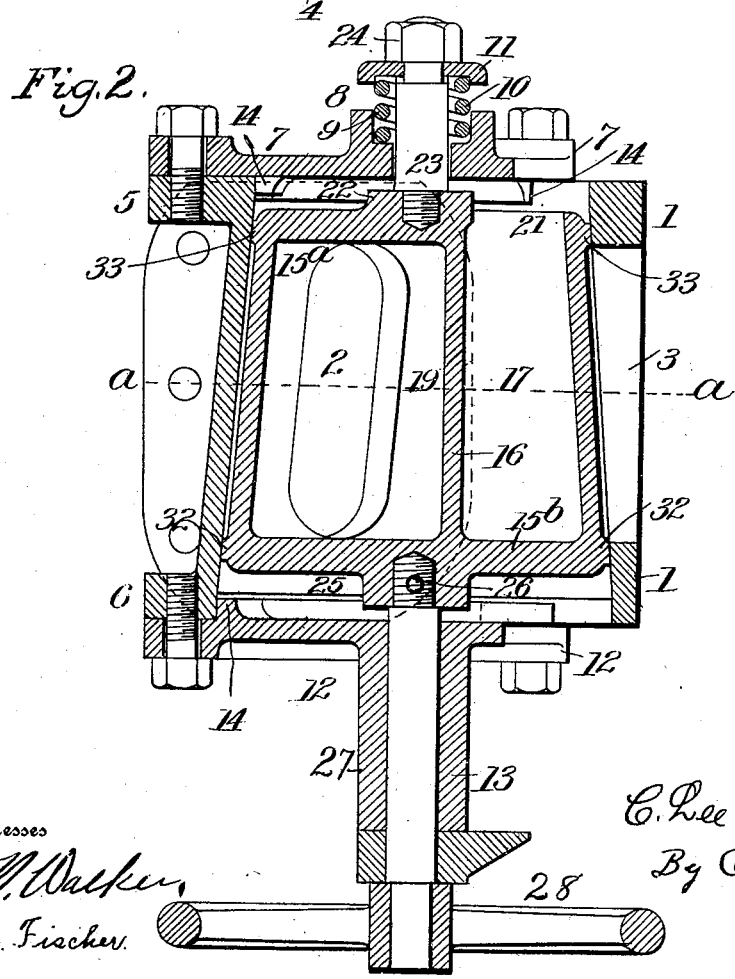
Figure 3:
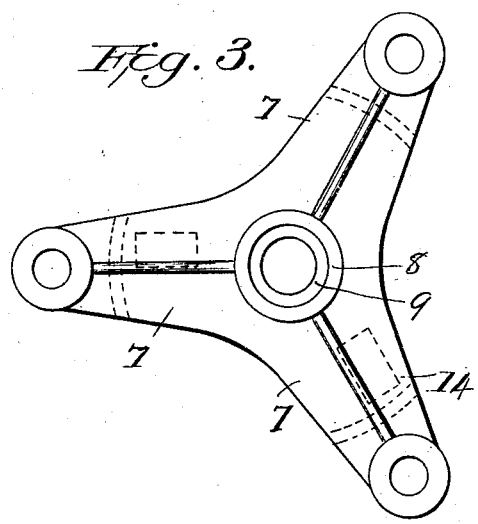
Figure 4:
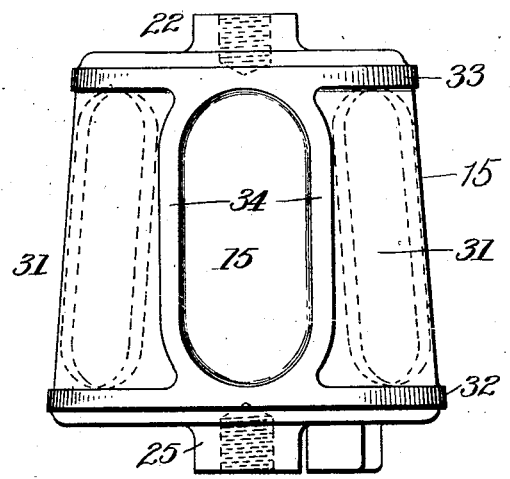

I will now describe the details of construction by reference to the accompanying drawings, in which, Figure 1 represents a transverse section on line *a—a*, Fig. 2. Fig. 2 represents a longitudinal central section on line *b—b*, Fig. 1. Fig. 3 represents a plan view of the top spider. Fig. 4 represents an elevation of the valve plug.

The tapering casing 1 is open at top and bottom or at both ends and is provided at equal distances in its circumference,—arcs of 120 degrees between centers,—with three flanged projecting ports 2, 3 and 4 which are provided with tapped openings for bolting thereto the flanges of connecting pipes, leading, respectively, to a generator or producer, an economizer and a purge stack. It will be understood that this is only one of the applications of my three-way valve. The opposite ends of the casing, Fig. 2, are provided with outwardly turned flanges or ears 5 and 6 having tapped holes for connection of spiders 7 and 12. The upper spider 7 is provided with a central boss 8 having a central opening and a cup-seat 9 for a spiral pressure spring 10, above which is applied a bearing washer 11 and a nut 24 on the short stem 23. The arms of the spider are provided with inwardly projecting lugs 14 for centering it in the casing and bearing on the inner face thereof. The lower spider 12 is cast with a central depending, or outwardly projecting, tubular guide-way 13, as a bearing for the long stem 27. The arms are also provided with inwardly projecting lugs 14 bearing on the interior face of the casing.

The tapered hollow plug 15 is cast with a curved partition 16 connecting its opposite heads 15$^a$ and 15$^b$ and forming a dead air chamber 17, and a through-way 18 connecting the two ports 19 and 20, adapted to register with any two ports in the casing. The crescent shaped dead-air chamber 17 has an opening 21 in the upper head 15$^a$ to facilitate casting of the plug. The ports 19 and 20 are elliptical as shown in Fig. 2. The upper open head has a central boss 22 provided with a tapped opening or socket in which is secured the threaded end of the short stem 23, around which is placed the spring 10 which is held in its cup 9 by the washer 11 and nut 24 on stem 23. The lower closed head is provided with a central boss 25 having a tapped opening in which is connected the long stem 27 by a transverse pin 26. The stem 27 extends through the guide-way 13 and is provided at its outer end with a hand wheel 28. The extremities of the arms of the spiders are provided with holes for tap bolts for securing the spiders to the flanges 5 and 6 of the casing.

The plug is made with short outwardly projecting ribs 30 around the ports 19 and 20 and with circumferential ribs 32 and 33, Fig. 4, at its lower and upper ends, thereby forming shallow recesses or spaces 31 between the walls of the plug and casing. The bearing edges of these ribs are finished smooth for working on the interior finished surface of the casing and making tight joints therewith. The bearing edges of these ribs are the only portions of the plug from which the casting skin is removed. This skin being very hard and not attacked by the acid gases gives a protective coating to all exposed surfaces of the plug. The construction of the plug is such that no port or passage gives access of gases or other fluid to the wall of the casing. The valve therefore, is particularly durable and not liable to leak or get out of order. By reference to Fig. 4 it will be seen that the wall of the plug is provided with ribs 34 in position to register with port 3 in the casing, or with any other port to which that portion of the plug may be turned and cover, so that any back flow of gas or vapor from any source will be prevented from entering the spaces 31 between the plug and casing. In case dirt lodges on the inner face of the casing, as may occur when the valve is rotated, the ribs 30 and 34 scrape it off and maintain a clean surface.

The valve has been used in the upright position shown in Fig. 2 because in such position it was best suited to the conditions present in the apparatus, but it may be used in any desired position without affecting its efficiency. In case the plug becomes unduly heated and expanded, causing it to stick in its seat, in which it is held by pressure spring 10, a blow on the short stem 23 will loosen it, so that it may be readily rotated to connect any two ports in the casing. A quick downward pull on the long stem 27 will serve the same purpose. The spring will return or draw the plug up to make a close fit in the casing.

What I claim and desire to secure by Letters Patent, is:

1. The combination with a valve casing having three ports, of a hollow plug having a single through-way and two ports, a transverse longitudinal partition plate forming with one wall a dead air chamber open at one end to facilitate casting the plug, narrow bearing ribs around its port openings and other bearing ribs on its body adapted to register with the third port in the casing, means for holding the plug in its seat and means for rotating it.

2. The combination with a valve casing having three ports, of a hollow plug having a through-way and two ports adapted to be registered with any two ports of the casing and having short narrow bearing ribs at its ports and other bearing ribs on its body adapted to register with any port in the casing when closed, said ribs having finished bearing edges for bearing on the finished interior surface of the casing and serving to scrape and then clean said interior surface, substantially as described.

3. The combination with a valve casing having three ports, of a hollow plug having a through-way and two registering ports, also having narrow bearing ribs for the three ports in the casing, the casting skin being retained on all exposed surfaces, whereby such surfaces will be protected from erosion by sulfurous or other acid gases, substantially as described.

4. The combination with a tapering valve casing having ports, of a hollow tapering plug having registering ports, a spider on the end of the casing, a short stem in the smaller end of the plug, passing through an opening in the spider and having a bearing, and a spring interposed between the spider and the bearing on the stem to yieldingly hold the plug in its seat but permitting endwise movement thereof in case of binding or sticking, so that the plug may be loosened and rotated, substantially as described.

In testimony whereof I affix my signature in presence of two witnesses.

CONSTANTINE LEE STRAUB.

Witnesses:
   W. R. FULLER,
   H. A. KIMBER.